(12) United States Patent
Mirsky et al.

(10) Patent No.: US 10,965,576 B2
(45) Date of Patent: Mar. 30, 2021

(54) METHOD AND APPARATUS FOR CONTROL PLANE TO CONFIGURE MONITORING OF DIFFERENTIATED SERVICE CODE POINT (DSCP) AND EXPLICIT CONGESTION NOTIFICATION (ECN)

(71) Applicant: Telefonaktiebolaget LM Ericsson (publ), Stockholm (SE)

(72) Inventors: Gregory Mirsky, Pleasanton, CA (US); Steve Baillargeon, Gatineau (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/075,133

(22) PCT Filed: Feb. 5, 2016

(86) PCT No.: PCT/IB2016/050615
§ 371 (c)(1),
(2) Date: Aug. 2, 2018

(87) PCT Pub. No.: WO2017/134488
PCT Pub. Date: Aug. 10, 2017

(65) Prior Publication Data
US 2018/0375753 A1 Dec. 27, 2018

(51) Int. Cl.
*H04L 12/26* (2006.01)
*H04L 12/24* (2006.01)

(52) U.S. Cl.
CPC .......... *H04L 43/50* (2013.01); *H04L 41/0873* (2013.01); *H04L 43/026* (2013.01); *H04L 43/0882* (2013.01)

(58) Field of Classification Search
CPC ... H04L 43/50; H04L 41/0873; H04L 43/026; H04L 43/0882
(Continued)

(56) References Cited

U.S. PATENT DOCUMENTS

| 6,839,321 B1 | 1/2005 | Chiruvolu |
| 7,340,529 B1 | 3/2008 | Yazaki et al. |

(Continued)

FOREIGN PATENT DOCUMENTS

| EP | 2648441 A1 | 10/2013 |
| JP | 2014502459 A | 1/2014 |

(Continued)

OTHER PUBLICATIONS

Hedin, et al., "Differentiated Service Code Point and Explicit Congestion Notification Monitoring in Two-Way Active Measurement Protocol (TWAMP)" draft-ietf-ippm-type-p-monitor-03, Network Working Group Internet-Draft, IETF Trust, Nov. 4, 2015, 10 pages.

(Continued)

*Primary Examiner* — Gregory B Sefcheck
*Assistant Examiner* — Majid Esmaeilian
(74) *Attorney, Agent, or Firm* — NDWE, LLP

(57) ABSTRACT

A method is executed by a network device implementing a control-client to configure a session-sender to perform a test to determine whether differentiated services code point (DSCP) and explicit congestion notification (ECN) are modified in a single test session in a forward direction and a reverse direction between the session-sender and a session-reflector. Multiple DSCP and ECN are tested using the single test session. The method includes receiving a server greeting message from a server including characteristics of the session-reflector, determining whether the session-reflector supports use of multiple DSCP in the single test session, setting a set-up-response message to indicate DSCP and ECN testing, and determining whether the session-reflector supports DSCP and ECN monitoring. The method further includes adding an indicator of DSCP and ECN monitoring in the set-up-response message, in response to a (Continued)

determination that the session-reflector supports DSCP and ECN monitoring, and sending the setup-response message to the server.

19 Claims, 11 Drawing Sheets

(58) Field of Classification Search
USPC .......................................................... 370/252
See application file for complete search history.

(56) References Cited

U.S. PATENT DOCUMENTS

| | | |
|---|---|---|
| 7,911,959 B2 | 3/2011 | Ayyagari et al. |
| 8,112,517 B2 | 2/2012 | Takeshima et al. |
| 8,238,254 B2 | 8/2012 | Meloche |
| 8,339,963 B2 | 12/2012 | Babiarz et al. |
| 8,619,621 B2 | 12/2013 | Omar |
| 8,724,467 B2 | 5/2014 | Le et al. |
| 8,755,282 B2 | 6/2014 | Smith et al. |
| 9,236,559 B2 | 1/2016 | Krueger et al. |
| 9,306,812 B2 | 4/2016 | Srivastava et al. |
| 9,306,830 B2 * | 4/2016 | Robitaille ........... H04L 43/0835 |
| 9,326,182 B2 | 4/2016 | Baillargeon |
| 9,331,925 B2 | 5/2016 | Patel et al. |
| 9,338,678 B2 | 5/2016 | Baillargeon |
| 9,350,657 B2 | 5/2016 | Gross et al. |
| 9,602,383 B2 | 3/2017 | Baillargeon |
| 9,723,049 B2 | 8/2017 | De Vleeschauer et al. |
| 9,906,453 B2 | 2/2018 | Vincent |
| 9,954,779 B2 | 4/2018 | Pitchai et al. |
| 10,425,351 B2 | 9/2019 | Eriksson et al. |
| 10,476,770 B2 | 11/2019 | Lohiya et al. |
| 10,616,185 B2 | 4/2020 | Mihaly et al. |
| 10,645,014 B2 | 5/2020 | Tomici et al. |
| 2010/0290344 A1 | 11/2010 | Meloche |
| 2012/0128000 A1 * | 5/2012 | Baillargeon ............ H04L 43/10 370/392 |
| 2014/0119221 A1 * | 5/2014 | Park ........................ H04L 43/16 370/252 |
| 2014/0169183 A1 | 6/2014 | Allan et al. |
| 2014/0237327 A1 * | 8/2014 | Bi ........................ H04L 43/0847 714/799 |
| 2015/0058479 A1 * | 2/2015 | Kolhi ...................... H04L 43/00 709/224 |
| 2016/0021058 A1 * | 1/2016 | Chen ..................... H04L 69/162 726/13 |
| 2016/0026490 A1 * | 1/2016 | Johnsson ................. H04L 45/74 718/1 |
| 2016/0192233 A1 * | 6/2016 | Sarker ................. H04L 47/2441 370/236 |
| 2017/0373950 A1 * | 12/2017 | Szilagyi .................. H04L 43/00 |
| 2018/0375754 A1 | 12/2018 | Mirsky et al. |

FOREIGN PATENT DOCUMENTS

| | | |
|---|---|---|
| JP | 2015537493 A | 12/2015 |
| WO | 2014200406 A1 | 12/2014 |
| WO | 2016012991 A1 | 1/2016 |

OTHER PUBLICATIONS

RFC 4656: Shalunov, et al., "A One-way Active Measurement Protocol (OWAMP)," Network Working Group, The Internet Society, Request for Comments: 4656, Sep. 2006, 56 pages.

RFC 5357: Hedayat, et al., "A Two-Way Active Measurement Protocol (TWAMP)," Network Working Group, Request for Comments: 5357, Oct. 2008, 26 pages.

United States Patent and Trademark Office, Advisory Action, U.S. Appl. No. 16/075,134, dated Jun. 18, 2020, 7 pages.

United States Patent and Trademark Office, Office Action Summary (NFOA), U.S. Appl. No. 16/075,134, dated Jul. 27, 2020, 20 pages.

* cited by examiner

METHOD AND APPARATUS FOR CONTROL PLANE TO CONFIGURE MONITORING OF DIFFERENTIATED SERVICE CODE POINT (DSCP) AND EXPLICIT CONGESTION NOTIFICATION (ECN)

CROSS-REFERENCE TO RELATED APPLICATIONS

This application is a national stage of International Application No. PCT/IB2016/050615, filed Feb. 5, 2016, which is hereby incorporated by reference.

FIELD

Embodiments of the invention relate to the field of data traffic measurement and more specifically, to monitoring differentiated services code point (DSCP) values and explicit congestion notification (ECN) values. The embodiments enable the testing of multiple combinations of DSCP and ECN using a single test session.

BACKGROUND

The Two-Way Active Measurement Protocol (TWAMP), defined by Internet Engineering Task Force (IETF) Request for Comment (RFC) 5357, is broadly used to measure delay and delay variation in Internet Protocol (IP) networks. TWAMP is based on an earlier protocol One-Way Active Measurement Protocol (OWAMP), defined by IETF RFC 4656. TWAMP provides a common protocol for measuring two-way metrics between network devices. The measurements are performed in a test session that enables two-way or roundtrip measurement of data traffic in the test session between two network devices.

TWAMP consists of two inter-related protocols: a control protocol (TWAMP-Control) and a test protocol (TWAMP-Test). TWAMP-Control is used to initiate, start and stop test sessions, whereas TWAMP-Test is used to exchange test packets between two TWAMP entities. There are a set of TWAMP entities or TWAMP logical entities, referred to as a session-sender, session-reflector, server and control-client.

The control-client initiates a transmission control protocol (TCP) connection with the server, which responds with a greeting message. The control-client responds with mode information and the server then sends its acceptance. The control-client configures the session-sender to send test packets in a test session with the session-reflector. The server configures the session-reflector to return the test packets received from the session-sender to the session-sender. Thus, in this way TWAMP establishes test sessions where the session-sender can identify and measure the flow of data traffic between the network devices implementing the session-sender and the session-reflector, respectively.

Each test session is conducted with Differentiated Services Code Point (DSCP) and Explicit Congestion Notification (ECN) fields. The DSCP and ECN Monitoring extension to TWAMP lets operators detect remarking, intended or erroneous, of the DSCP field as well as changes in the ECN field in the forward and reverse directions between the two test points. But to test multiple combinations of DSCP and ECN requires a separate test session to be established for each combination. Thus, in the case where the TWAMP-Control protocol is used to negotiate a TWAMP test session, test parameters, including source and destination user datagram protocol (UDP) port numbers, will be re-negotiated which may affect the result of the DSCP and ECN monitoring. And in the case where TWAMP is controlled by a command line interface (CLI) or network management system (NMS)/central controller, separate test sessions must be configured.

SUMMARY

In one embodiment, a method is executed by a network device implementing a control-client to configure a session-sender to perform a test to determine whether differentiated services code point (DSCP) and explicit congestion notification (ECN) are modified in a single test session in a forward direction and a reverse direction between the session-sender and a session-reflector, where multiple DSCP and ECN are tested using the single test session. The method includes receiving a server greeting message from a server including characteristics of the session-reflector, determining whether the session-reflector supports use of multiple DSCP in the single test session, setting a set-up-response message to indicate DSCP and ECN testing, and determining whether the session-reflector supports DSCP and ECN monitoring. The method further includes adding an indicator of DSCP and ECN monitoring in the set-up-response message, in response to a determination that the session-reflector supports DSCP and ECN monitoring, and sending the set-up-response message to the server.

In one embodiment, a method executed by a network device implementing a server to configure a session-reflector to perform a test to determine whether differentiated services code point (DSCP) and explicit congestion notification (ECN) are modified in a single test session in a forward direction and a reverse direction between a session-sender and the session-reflector, where multiple DSCP and ECN are tested using the single test session. The method includes sending a server greeting message to a control-client including session-reflector characteristics including support for use of multiple DSCP and ECN in a session, receiving a set-up-response message from the control-client indicating DSCP and ECN testing parameters, and configuring the session-reflector according to the DSCP and ECN testing parameters.

In one embodiment, a network device implements a client-controller to configure a session-sender to perform a test to determine whether differentiated services code point (DSCP) and explicit congestion notification (ECN) are modified in a single test session in a forward direction and a reverse direction between the session-sender and a session-reflector, where multiple DSCP and ECN are tested using the single test session. The network device includes a non-transitory machine readable medium having stored therein a test session manager, and a processor. The processor is coupled to the non-transitory machine readable medium. The processor executes the test session manager. The test session manager is configured to receive a server greeting message from a server including characteristics of the session-reflector, to determine whether the session-reflector supports use of multiple DSCP in the single test session, to set a set-up-response message to indicate DSCP and ECN testing, to determine whether the session-reflector supports DSCP and ECN monitoring, to add an indicator of DSCP and ECN monitoring in the set-up-response message, in response to a determination that the session-reflector supports DSCP and ECN monitoring, and to send the set-up-response message to the server.

In a further embodiment, a network device implements a server to configure a session-reflector to perform a test to determine whether differentiated services code point (DSCP) and explicit congestion notification (ECN) are modified in a single test session in a forward direction and a reverse direction between a session-sender and the session-reflector, where multiple DSCP and ECN are tested using the single test session. The network device including a non-transitory machine readable medium having stored therein a test session manager, and a processor. The processor is coupled to the non-transitory machine readable medium. The processor executes the test session manager. The test session manager is configured to send a server greeting message to a control-client including session-reflector characteristics including support for use of multiple DSCP and ECN in a session, to receive a set-up-response message from the control-client indicating DSCP and ECN testing parameters, and to configure the session-reflector according to the DSCP and ECN testing parameters.

In one embodiment, a computing device is in communication with a network device in a network with a plurality of network devices. The computing device executes a plurality of virtual machines for implementing network function virtualization (NFV), wherein a virtual machine from the plurality of virtual machines executes a server to configure a session-reflector to perform a test to determine whether differentiated services code point (DSCP) and explicit congestion notification (ECN) are modified in a single test session in a forward direction and a reverse direction between a session-sender and the session-reflector, where multiple DSCP and ECN are tested using the single test session. The computing device includes a non-transitory machine readable medium having stored therein a test session manager, and a processor. The processor is coupled to the non-transitory machine readable medium. The processor executes a virtual machine. The virtual machine executes the test session manager. The test session manager is configured to send a server greeting message to a control-client including session-reflector characteristics including support for use of multiple DSCP and ECN in a session, to receive a set-up-response message from the control-client indicating DSCP and ECN testing parameters, and to configure the session-reflector according to the DSCP and ECN testing parameters.

In another embodiment, a control plane device is configured to implement a control plane of a software defined networking (SDN) network including a plurality of network devices, wherein the control plane device is configured to execute a method to implement an orchestrator to perform a test to determine whether differentiated services code point (DSCP) and explicit congestion notification (ECN) are modified in a single test session in a forward direction and a reverse direction between a session-sender and a session-reflector, where multiple DSCP and ECN are tested using the single test session. The control plane device includes a non-transitory machine readable medium having stored therein the orchestrator, and a processor coupled to the non-transitory machine readable medium. The processor executes the orchestrator. The orchestrator is configured to determine characteristics of the session-reflector, to determine whether the session-reflector supports use of multiple DSCP in a single test session, to set a configuration message to indicate DSCP and ECN testing, to determine whether the session-reflector supports DSCP and ECN monitoring, to add an indicator of DSCP and ECN monitoring in the configuration message, in response to a determination that the session-reflector supports DSCP and ECN monitoring, and to send the configuration message to the session-sender and session-reflector.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1A:
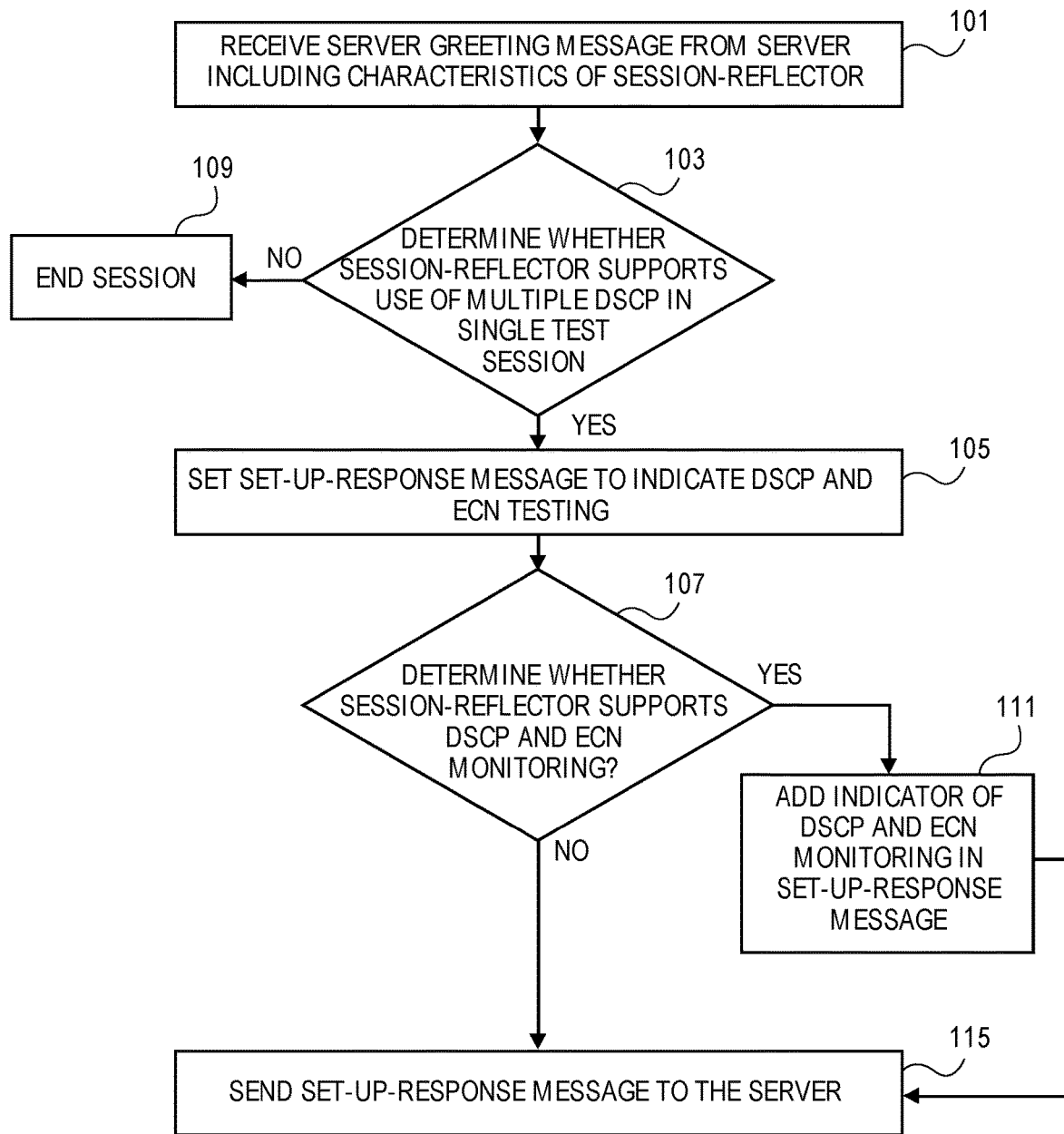
FIG. 1A is a flowchart of one embodiment of a process for a control-client of the two-way active measurement protocol (TWAMP).

The following description describes methods and apparatus for data traffic measurement and more specifically for testing of multiple combinations of the differentiated services code point (DSCP) and explicit congestion notification (ECN) using the two-way active measurement protocol (TWAMP) or similar protocol. The embodiments enable the testing of multiple combinations using a single test session. Using a single test session decreases the overhead associated with testing multiple DSCP and ECN combinations where the overhead is caused by the set up and tear down of multiple test sessions. The existing art requires a separate test session be established for each combination of DSCP and ECN to be tested thereby requiring additional compute and storage resources. The embodiments provided are described primarily with relation to implementing the test sessions using TWAMP, however, one skilled in the art would understand that the principles and processes are also applicable to other similar testing session technologies including ping, service-level agreement (SLA) testing and similar technologies.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

Each Two-Way Active Measurement Protocol (TWAMP) test session is conducted with a particular differentiated services code point (DSCP) and explicit congestion notification (ECN) that are used in the test packet exchanged between the session-sender and the session-reflector. The DSCP and ECN are fields in TWAMP test packets utilized in a TWAMP test session that are expected to remain unchanged on the forward and reverse paths between the session-sender and session-reflector. A DSCP and ECN Monitoring extension to TWAMP can be defined that lets an operator detect re-marking of data traffic, whether intended or erroneous, of a DSCP field in a test packet as well as changes in an ECN field. The monitoring of these fields can be conducted in the forward and reverse directions between the two test points (i.e., the session-sender and the session-reflector). But to test and monitor the results of multiple combinations of DSCP and ECN, up to and including all combinations of DSCP and ECN, or any sub-set of these values, requires a separate test session to be established for each DSCP and ECN combination to be tested, including in some embodiments repeated testing of the same DSCP and ECN combinations. Thus, in the case where the TWAMP-Control protocol is used to negotiate and establish a TWAMP test session, the test parameters, including source and destination user datagram protocol (UDP) port numbers, will be re-negotiated, which may affect the results of the DSCP and ECN monitoring. In the case where TWAMP is controlled by a command line interface (CLI) or a network management system (NMS)/central controller, separate test sessions must be configured to test and monitor each DSCP and ECN combination.

Consistent with the existing TWAMP-Control protocol, the CLI or central controller can be used to configure parameters, including particular values of DSCP and ECN fields for a test session. In some embodiments, a DSCP and ECN Monitoring TWAMP extension is utilized to enable the detection of changes in DSCP and ECN in the forward and reverse directions of the test session, but still only for the single combination of these DSCP and ECN values. The existing TWAMP-Test protocol requires that DSCP and ECN values set by the session-sender and session-reflector remain the same over the lifetime of the particular test session. Having to test multiple DSCP and ECN combinations using separate TWAMP test sessions incurs significant overhead in setting up and tearing down each test session on a per combination (1:1) basis. The embodiments of the invention overcome this limitation of the prior art.

The embodiments overcome the deficiencies of the TWAMP process for monitoring DSCP and ECN by adding a mechanism to instruct a session-reflector to use specific DSCP and ECN values defined in the received TWAMP test packet as the DSCP and ECN values in the corresponding reflected TWAMP test packet. In combination with a specific DSCP and ECN monitoring TWAMP extension that extends TWAMP to include the requisite DSCP and ECN, the embodiments provide a set of methods and systems that can utilize this information to enable comprehensive DSCP and ECN monitoring in a single test session.

The embodiments overcome the limitations of the existing TWAMP protocol, by providing a method and apparatus to be used by network entities that negotiate parameters of one-sided two-way monitoring of DSCP and ECN to request a specific DSCP and ECN monitoring mode by the session-reflector. The embodiments propose a method and apparatus to be used by a network device implementing DSCP and ECN monitoring in an Internet Protocol (IP) network to specify a DSCP and ECN handling mode used in the given test singleton. RFC 5357 specifies the TWAMP Control protocol that can be used to negotiate and signal parameters for a TWAMP test session. The server in the modes field in the server greeting message lists capabilities of the session-reflector. The control-client in the modes field of the set-up-response message requests modes on behalf of the session-sender. Each server and control-client compare advertised capabilites and set the test mode for the session-sender and the session-reflector accordingly.

In one embodiment, DSCP and ECN monitoring is implemented in the forward and reverse directions. A check is made whether the session-reflector supports both the DSCP and ECN Monitoring TWAMP extension. A TWAMP extension refers to a modification and expansion of the capabilities of the basic TWAMP defined in RFC 5357. If the session-reflector can handle DSCP and ECN monitoring, then the session-reflector can be configured for handling at least the round-trip testing (i.e., the session-reflector supports a DSCP and ECN monitoring TWAMP extension). If the session-reflector does not support DSCP and ECN monitoring then the TWAMP control protocol negotiation between the control-client and server will not start a TWAMP test session (i.e., in the case where the session-reflector cannot support the DSCP and ECN Monitoring extension). In cases when a command line interface (CLI) or central controller (e.g., in an SDN network) are used to configure parameters of the TWAMP test session, selection of mode can be done based on capabilities reported by the session-sender and the session-reflector in response to either a CLI, Netconf or similar query. If the session-reflector supports the DSCP and ECN monitoring or similar TWAMP extension then more detailed independent testing of the forward and reverse directions is possible. These embodiments provide advantages over the existing TWAMP implementation by enabling execution of a new type of IP performance measurement, DSCP and ECN monitoring, within a single TWAMP test session for a round trip and/or with separate forward and reverse testing. The features of the embodiments can be implemented as an extension to TWAMP that is referred to herein as the single test session multiple DSCP TWAMP extension.

FIG. 1A is a flowchart of one embodiment of a process for a client-control entity of the two-way active measurement protocol (TWAMP). This embodiment of the control-client process is implemented where the control-client is implemented by a network device in communication with the network device that implements the server or the server and session-reflector. The network device that implements the control-client may in some embodiments also implement the session-sender. The process begins within the context of the operation of the TWAMP control protocol, which is the control plane of TWAMP. The server and control-client are exchanging messages that include information related to the characteristics and/or capabilities of the session-sender and session-reflector. The control-client establishes a TCP connection to initiate this negotiation.

After the TCP connection is established, the control-client receives the server greeting message from the server that includes the characteristics and capabilities of the session-reflector (Block 101). The server greeting message can in particular include information as to whether the session-reflector supports the DSCP and ECN monitoring TWAMP extension and/or the single test session multiple DSCP TWAMP extension or similar capabilities. These extensions to TWAMP enable the session-sender to generate and utilize a test session where multiple DSCP and ECN are tested in the same test session and a single test session enables independent testing in both the forward and reverse directions between the session-sender and the session-reflector.

The process of the control-client checks the received characteristics of the session-reflector for its support of these TWAMP extensions. The process checks whether the session-reflector supports the single test session multiple DSCP TWAMP extension, in other words, the session-reflector supports the use of multiple DSCP in a single test session (Block 103). If the session-reflector does not support multiple DSCP in a single test session then the process can end (Block 109), since the desired single test session process cannot be performed. In other embodiments, the process may revert to using multiple test sessions to perform the testing. If the session-reflector does support single test session multiple DSCP then the set-up-response message is prepared to be sent to the server by the control-client. This set-up-response message can be updated to indicate that DSCP and ECN testing is to be utilized in the associated test session (Block 105), which means that the test session is going to utilize this functionality of the session-reflector.

The control-client then checks whether the session-reflector supports DSCP and ECN monitoring (Block 107). If the session-reflector supports DSCP and ECN monitoring, the process adds an indicator to the set-up-response message to indicate that DSCP and ECN monitoring is to be implemented (Block 111). If the session-reflector does not support DSCP and ECN monitoring, then the process may forward the set-up-response message to the server (Block 115). The server can then use this information and feedback to configure the session-reflector to support the desired configuration of a test session using TWAMP. The implementation of this process can be via a TWAMP module executed by the network device implementing the control-client.

Figure 1B:
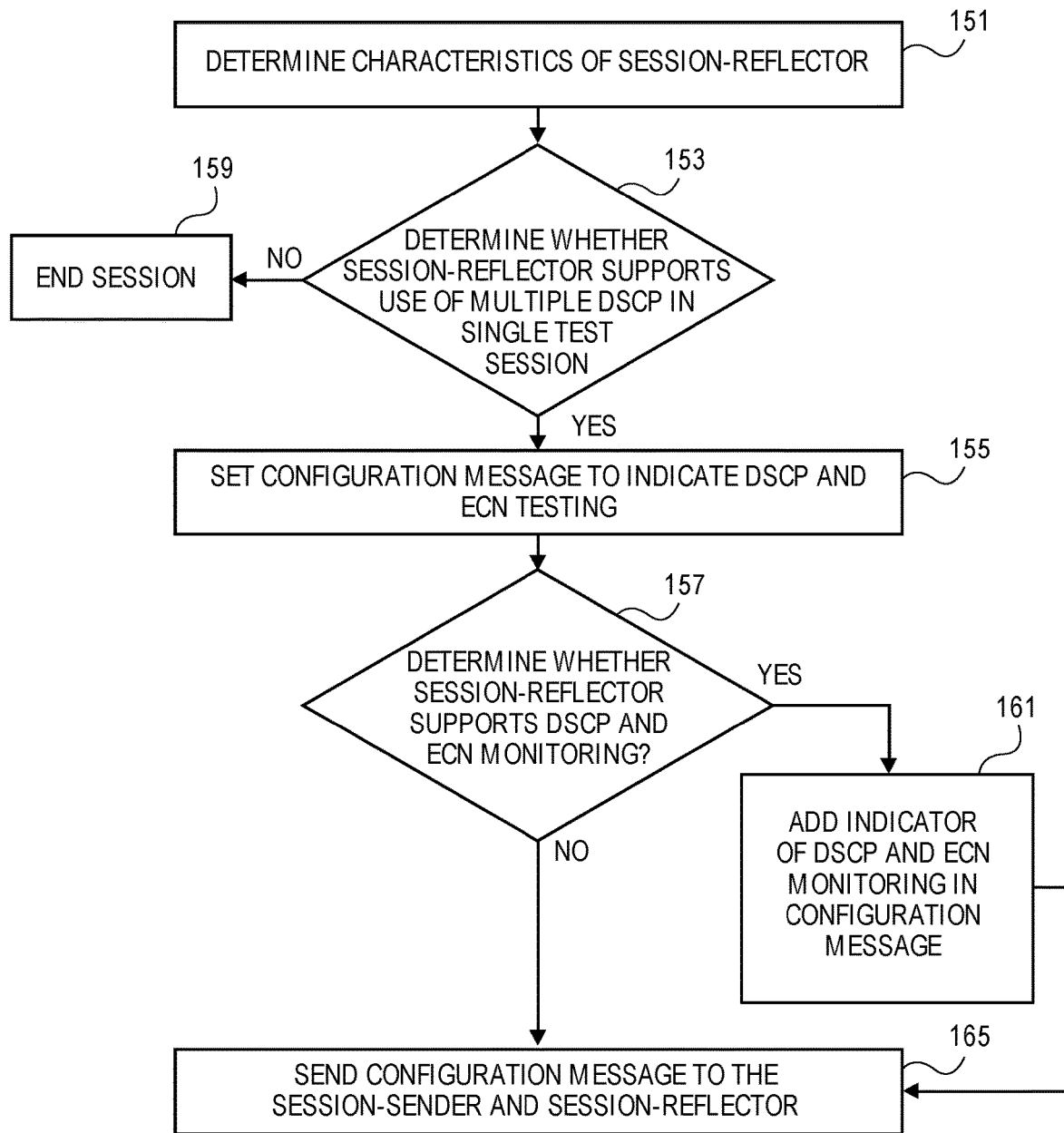
FIG. 1B is a flowchart of one embodiment of the process for an orchestrator of a TWAMP test session implemented by a software defined networking (SDN) controller.

FIG. 1B is a flowchart of one embodiment of the process for an orchestrator of a TWAMP test session implemented by a software defined networking (SDN) controller. In this embodiment, the process of determining the capabilities of the session-reflector and session-sender are implemented by the test session manager that is in the form of an orchestrator executed by the central controller. As with the control-client implementation, the test session manager must determine the characteristics of the session-reflector and/or the session-sender (Block 151). The session-reflector and/or session-sender can report their capabilities directly to the orchestrator of the central controller, or the control-client and server can report these capabilities, respectively. Once the capabilities are reported a determination is made to determine whether the session-reflector supports the use of multiple DSCP in a single test session (Block 153). If this is supported, then the configuration message to be sent to the session-reflector or server is updated to indicate that DSCP and ECN testing is to be performed (Block 155). If multiple DSCP in a single test session is not supported, then the process may end the configuration of the test session (Block 159), since the session-reflector is not capable of supporting it. This may result in the use of standard DSCP and ECN testing using separate test sessions for each DSCP and ECN combination.

Following updating of the configuration message, a determination is made whether support for DSCP and ECN monitoring is supported by the session-reflector and/or session-sender (Block 157). If the session-reflector (and session-sender) support the DSCP and ECN monitoring, then the configuration message can be updated to add an indicator that DSCP and ECN monitoring is to be utilized (Block 161). If the DSCP and ECN monitoring is not supported, then the configuration message is completed and it can be sent to the session-reflector or server to implement the configuration (Block 165). Configuration of the session-reflector is described, however, one skilled in the art would understand that the session-sender may be similarly configured to participate in the test session for DSCP and ECN testing in an equivalent manner with a similar configuration message generated, set and sent.

Figure 2:
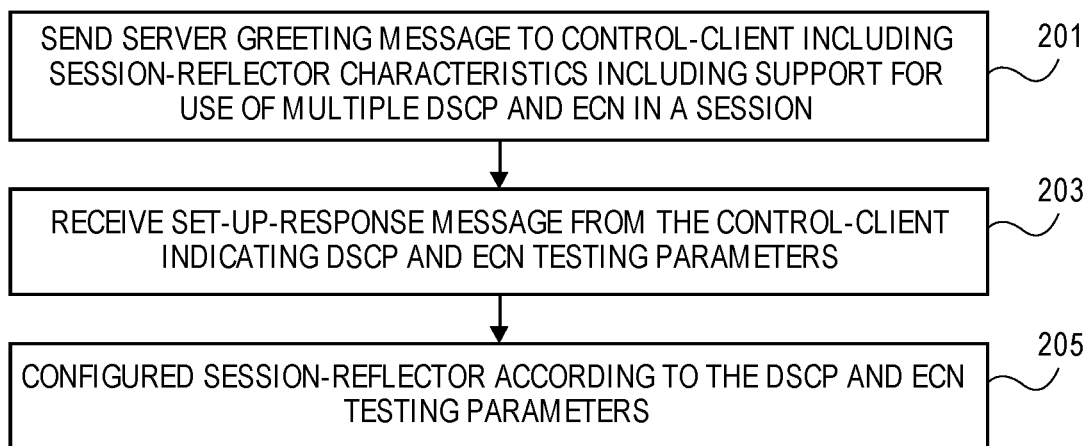
FIG. 2 is a flowchart of one embodiment of a process for the server of TWAMP.

FIG. 2 is a flowchart of one embodiment of a process for the server of TWAMP. The server is responsible for the configuration of the session-reflector to establish a TWAMP test session for DSCP and ECN testing. The process can be initiated by sending a server greeting message to the control-client that includes session-reflector characteristics and capabilities including whether the session-reflector supports multiple DSCP in single test session (e.g., via a single test session multiple DSCP TWAMP extension) and DSCP and ECN monitoring extensions to TWAMP (Block 201). In response to sending this message, the server may receive a set-up-response message from the control-client. The set-up-response message can indicate the test session parameters including the use of multiple DSCP in a single test session and DSCP and ECN monitoring parameters for a test session (Block 203). The server can then configure the session-reflector according to the received DSCP and ECN testing parameters (Block 205).

Figure 3:
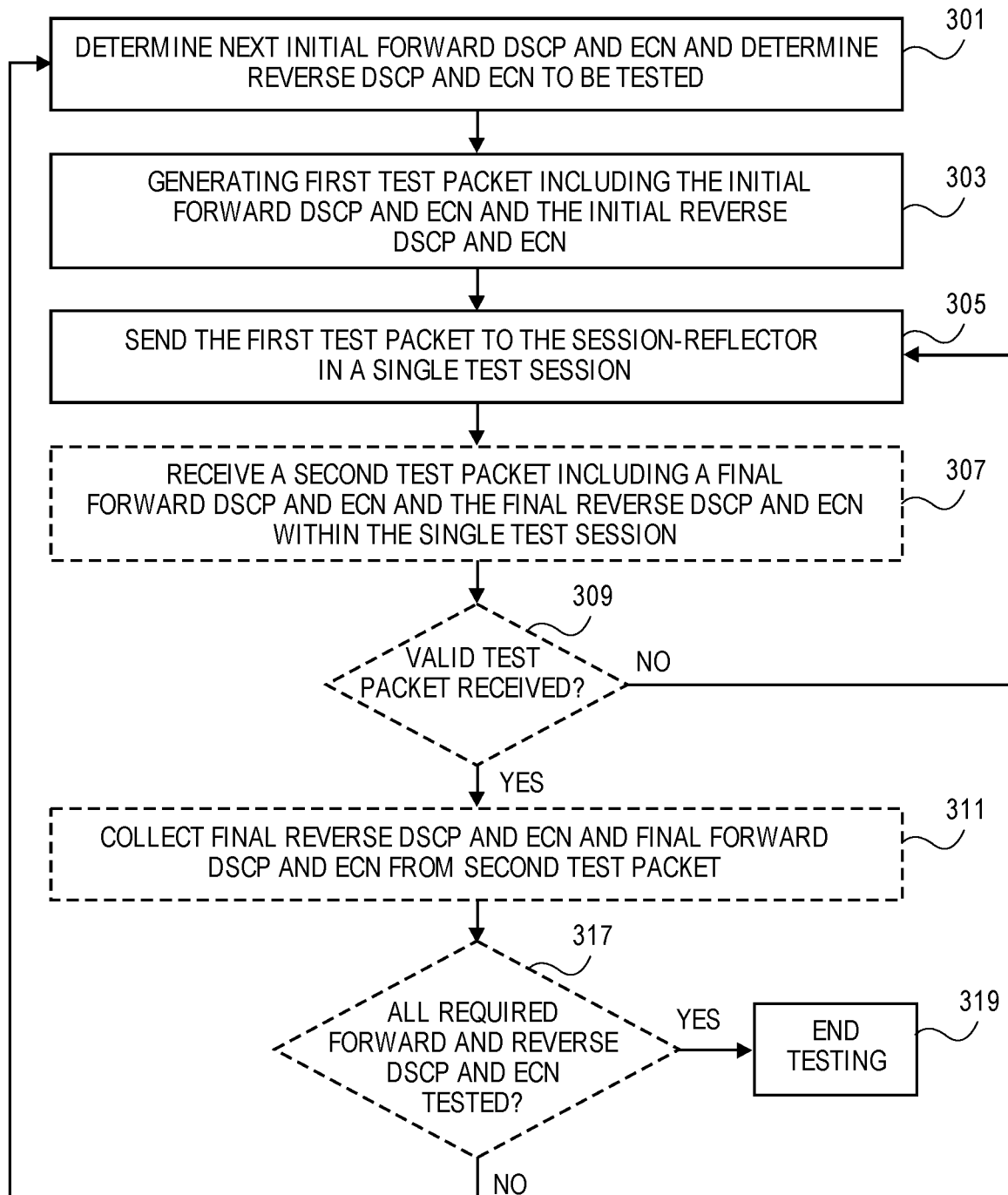
FIG. 3 is a flowchart of one embodiment of a process for the session-sender of TWAMP.

FIG. 3 is a flowchart of one embodiment of a process for the session-sender of TWAMP. The control-client configures the session-sender to start the TWAMP test session with the session-reflector. The session-sender then determines a next initial forward DSCP and ECN to be tested and determines a next initial reverse DSCP and ECN to be tested (Block 301). The session-sender then generates a first test packet including the next initial forward DSCP and ECN (e.g., in an IP header or similar location) and the next initial reverse DSCP and ECN (e.g., in a payload of the first test packet or similar location) (Block 303). The session-sender sends the generated first test packet having the selected forward and reverse DSCP and ECN as discussed above for use within a single test session (Block 305). In further embodiments, the first test packet may be sent as one of a set of test packets. These test packets can have the same DSCP and ECN combination. In this way the process can determine if any of the test packets in the set are modified as some may be handled or routed differently and sending a set rather than one test packet improves the likelihood of finding such an occurrence. However, for sake of clarity, the embodiments are described primarily with reference to sending a single test packet. One skilled in the art would understand that the principles, processes and structures also encompass the use of sets of test packets.

The first test packet includes two sets of DSCP and ECN that can be selected using any algorithm that iterates through the set of combinations to be tested. One of the two sets is for the forward direction (e.g., it may be in the IP header in the forward direction) and a second set for the reverse direction (e.g., the set may be in the payload to be used by the session-reflector when a second test packet is generated for the reverse direction). In this way the two directions (i.e., session-sender to session-reflector and then session-reflector to session-sender) can be separately tested. If the specified initial forward DSCP and ECN arrive at the session-reflector (i.e., in the forward direction) and the initial reverse DSCP and ECN arrive at the session-sender (i.e., in the reverse direction), then the DSCP and ECN testing for this combination is successful indicating that the DSCP and ECN are not altered in each direction. If the DSCP or ECN are changed in either direction, then it can be known that the change occurred in a particular direction, which would not be known if only roundtrip testing was possible (i.e., the same DSCP and ECN are used in the forward and reverse directions).

In response to the sending of the first test packet, the session-sender receives a second test packet having the final forward DSCP and ECN that reached the session-reflector and a final reverse DSCP and ECN (Block 307). The forward and reverse transmissions of the first test packet and second test packet, respectively, occur in the same test session. The test session remains open and this process can iterate through any number of DSCP and ECN combinations with separate sets of DSCP and ECN utilized in the forward and reverse directions. While the second test packet is sent in response to the first test packet, the sending and receiving of test packets can be handled in parallel by separate processes. The process is shown as a single process for sake of clarity. However, the test packets returned by a session-reflector can be handled in any order and not limited to a serial processing of the test packets.

In some embodiments, a check may be made whether a received second test packet is a valid test packet (Block 309). The validity check can authenticate or similarly analyze the content and format of the received second test packet. If the second test packet is not valid, then the first test packet can be resent. A limit may be placed on a number of attempts to resend a first test packet to get a valid response second test packet. If the packet is valid, or if no validity check is make, then the process proceeds to collect the final forward and final reverse DSCP and ECN from the second test packet (Block 311). This information can be correlated and stored in any data structure to enable the tracking of the success and failure of each DSCP and ECN combination tested. Where a set of test packets is sent and received, each of the set may be collected and analyzed individually or as a group.

A determination is then made whether all of the forward and reverse DSCP and ECN combinations have been tested (Block 317). If so, then the process of testing all of the designated DSCP and ECN combinations has completed (Block 319). If additional DSCP and ECN combination remain to be tested in either the forward or reverse direction, then the next DSCP and ECN combination is determine determined to be tested (Block 301). The process then continues within the same test session (i.e., the same TCP connection and TWAMP test session) until all of the specified subset of DSCP and ECN (which can include all DSCP and ECN combinations or any subset thereof) have been tested.

Figure 4:
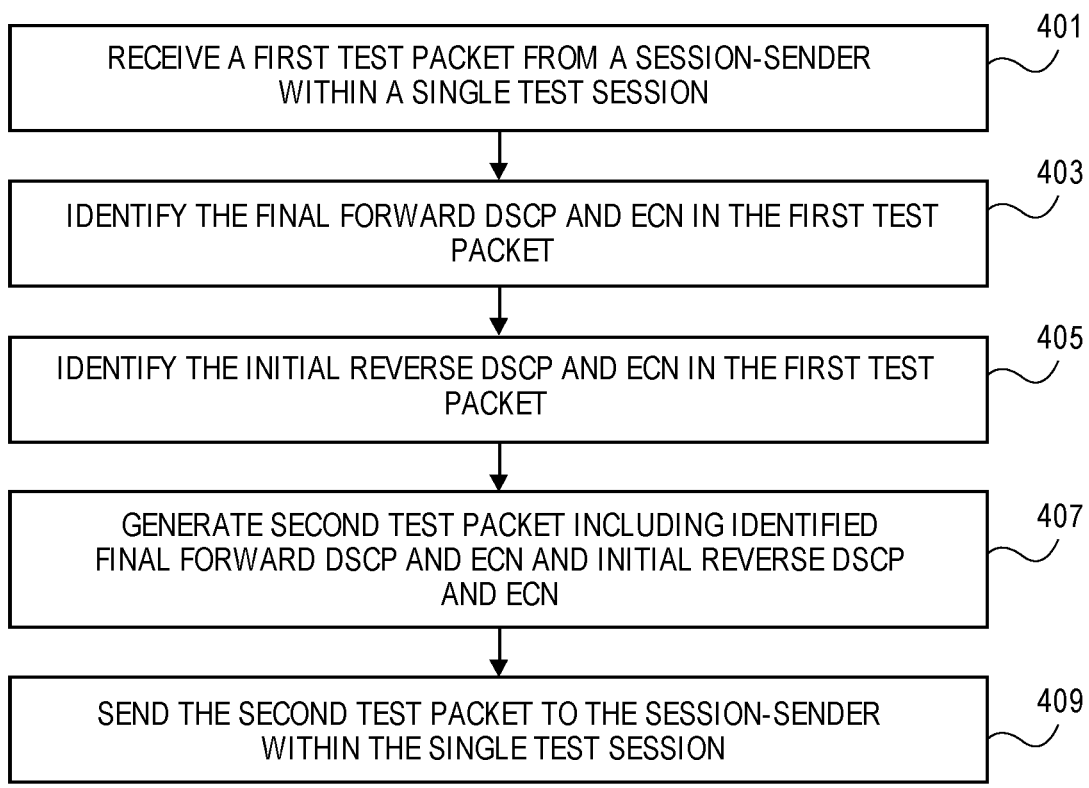
FIG. 4 is a flowchart of one embodiment of a process for the session-reflector of TWAMP.

FIG. 4 is a flowchart of one embodiment of a process for the session-reflector of TWAMP. The session-reflector is configured by the server. The session-reflector receives a first test packet from the session-sender within a test session (Block 401). As mentioned above, the first test packet can be one of a set of test packets, however, each is handled individually as it is received at the session-reflector. In some embodiments (not shown), the first test packet can be validated and if not valid a request may be made to resend the first test packet. The session-reflector inspects the received first test packet and identifies and collects the final DSCP and ECN for the forward direction (Block 403). The DSCP and ECN set to be utilized in a second test packet for the reverse direction is then identified (Block 405). The DSCP and ECN to be used in the reverse direction can be in the payload or similar section of the received first test packet. In other embodiments, such as where the configuration is via a central controller or CLI, the reverse DSCP and ECN can be provided by the server or similarly configured at the session-reflector.

A second test packet is then generated by the session-reflector (Block 407). The determined DSCP and ECN for the reverse direction can be inserted along with any other relevant information into the second test packet. The information inserted into the second test packet can include the final forward DSCP and ECN of the first test packet, thereby reporting the results of the forward direction separately from the testing of the reverse direction. The first test packet final forward DSCP and ECN can be inserted into the payload of the second test packet. The generated second test packet is then sent toward the session-sender in the same test session as was used for the forward direction as well as any prior iterations of the process (Block 409). In embodiments, where the session-reflector does not support the DSCP and ECN monitoring, the identification of the separate reverse direction DSCP and ECN is not performed and the same DSCP and ECN that was received by the session-reflector is utilized in the response message.

Figure 5:
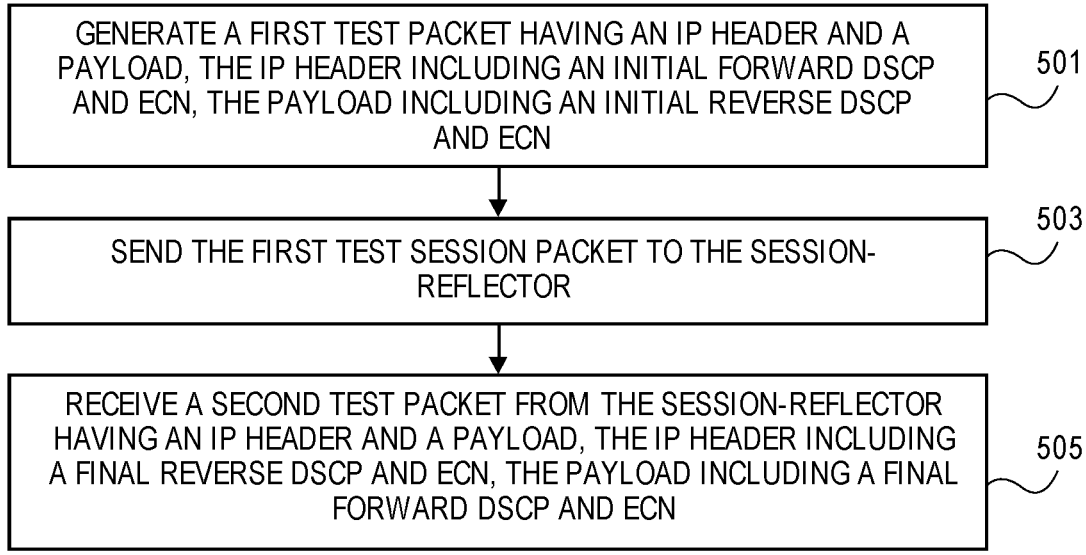
FIG. 5 is a flowchart of one example embodiment of another process for the session-sender of TWAMP.

FIG. 5 is a flowchart of one example embodiment of a process for the session-sender entity of TWAMP. The process is an example implementation of the test session. In this example implementation, the session-sender generates a first test packet having a payload including an initial reverse DSCP and ECN and an IP header having an initial forward DSCP and ECN (Block 501). In some embodiments, the first test packet can be part of a set of test packets having any number of test packets with the same DSCP and ECN. The DSCP and ECN placed in the payload are to be utilized for the reverse direction testing. The DSCP and ECN in the IP header are for the forward direction testing. The first test packet is then sent to the session-reflector (Block 503). In response to the first test packet, the session-reflector returns a second test packet (Block 505). The second test packet includes a final forward DSCP and ECN in the payload that identifies the actual DSCP and ECN received by the session-reflector in the forward direction from the first test packet, which can be compared to the initial forward DSCP and ECN sent by the session-sender. The IP header of the second test packet includes a final reverse DSCP and ECN. The final reverse DSCP and ECN can be compared to the expected initial reverse DSCP and ECN that were included in the first test packet. If the final forward and reverse DSCP and ECN differ from the initial forward and reverse DSCP and ECN, then the session-sender can determine whether a given DSCP and ECN combination is properly handled in the respective forward or reverse direction. This process can be implemented within a single TWAMP test session.

Figure 6:
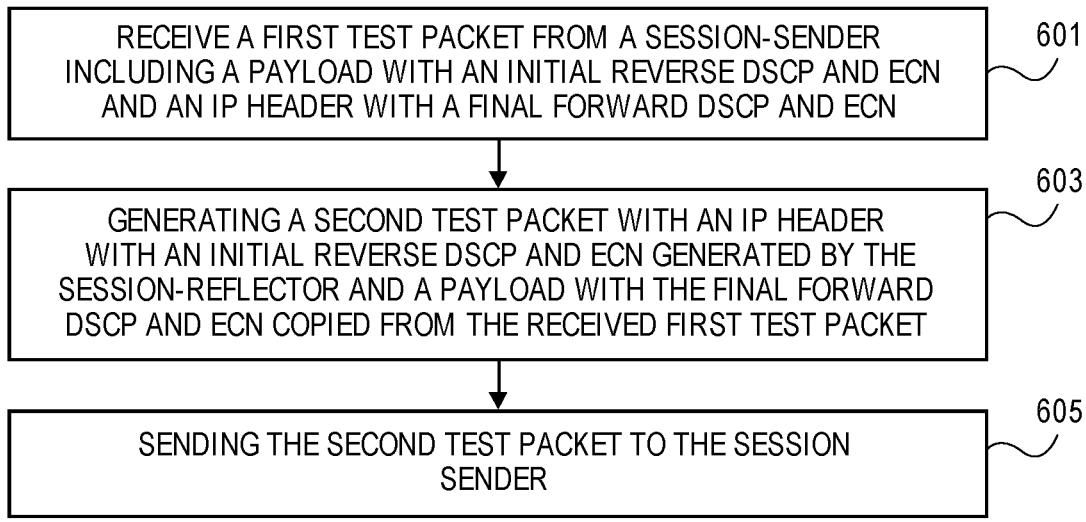
FIG. 6 is a flowchart of one example embodiment of another process for the session-reflector of TWAMP.

FIG. 6 is a flowchart of one example embodiment of another process for the session-reflector entity of TWAMP. This process is an example implementation that complements the session-sender process of FIG. 5. The process is implemented by the session-reflector. The session-reflector receives a first test packet from the session-sender (Block 601). The first test packet includes a payload with an initial reverse DSCP and ECN to be used for the reverse testing. The IP header has a second set of DSCP and ECN that are a final forward DSCP and ECN that can be returned to the session-sender to check whether the DSCP and ECN in the forward direction are being forwarded without alteration.

The session-reflector generates a second test packet with an IP header that contains the initial reverse DSCP and ECN designated in the payload of the message received from the session-sender (Block 603). The second test packet also includes the final forward DSCP and ECN from the IP header of the received first test packet. This can be placed in the payload of the second test packet to be checked by the session-sender. Once the second test packet has been completed it can be sent to the session-sender (Block 605).

Figure 7:
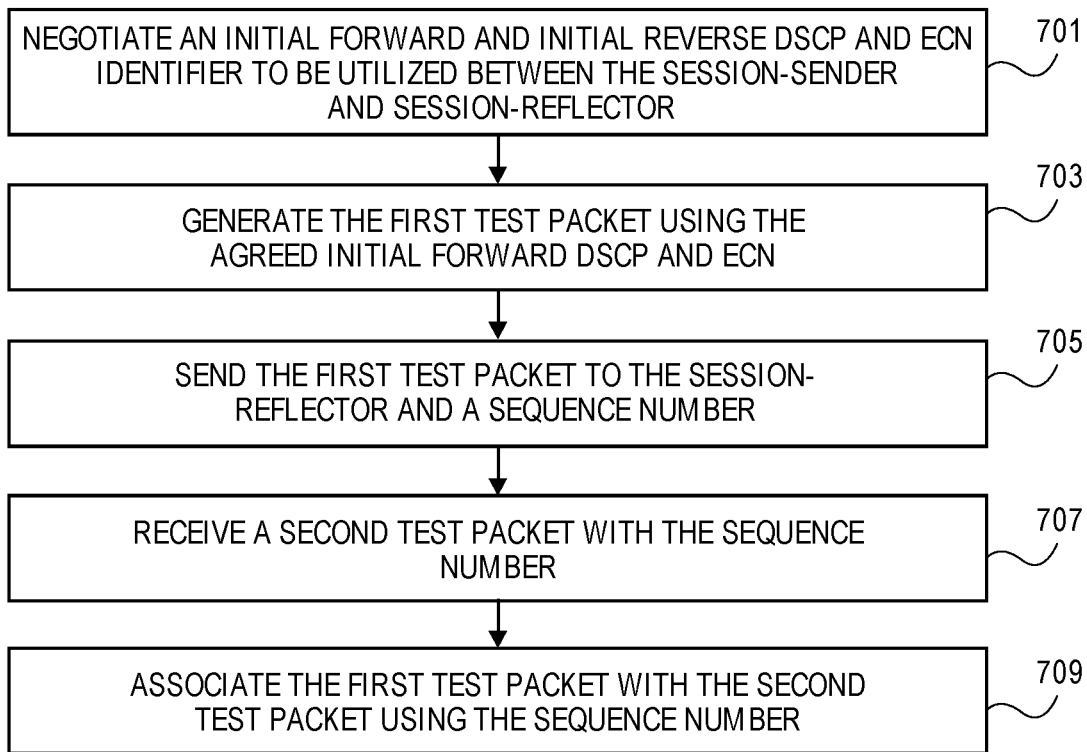
FIG. 7 is a flowchart of another example embodiment of a further process for the session-sender of TWAMP.

FIG. 7 is a flowchart of another example embodiment of a further process for the session-sender TWAMP. In this alternate implementation the DSCP and/or ECN for a reverse direction testing is not sent in the first test packet. Instead, it is separately negotiated by the control-client/session-sender and server/session-reflector. In this case, the DSCP and ECN to be utilized between the session-sender and session-reflector are negotiated by exchange of TWAMP control messages or using a similar mechanism (Block 701). The first test packet is then generated by the session-sender using the agreed upon initial forward DSCP and ECN for the forward direction (Block 703). The first test packet with the agreed upon initial forward DSCP and ECN is then sent to the session-reflector with a sequence number (Block 705). The DSCP and ECN combination that has been negotiated can be utilized for any number of test packets to be sent within the same test session, however, the sequence number will be advanced as each test packet is generated. A second test packet with the same sequence number is then returned by the session-reflector and received by the session-sender (Block 707). The second test packet is associated with the first test packet using the sequence number (Block 709). Once associated the verification can be carried out at the session-sender. The DSCP and ECN utilized in the reverse direction can be the same or negotiated separately.

Figure 8:
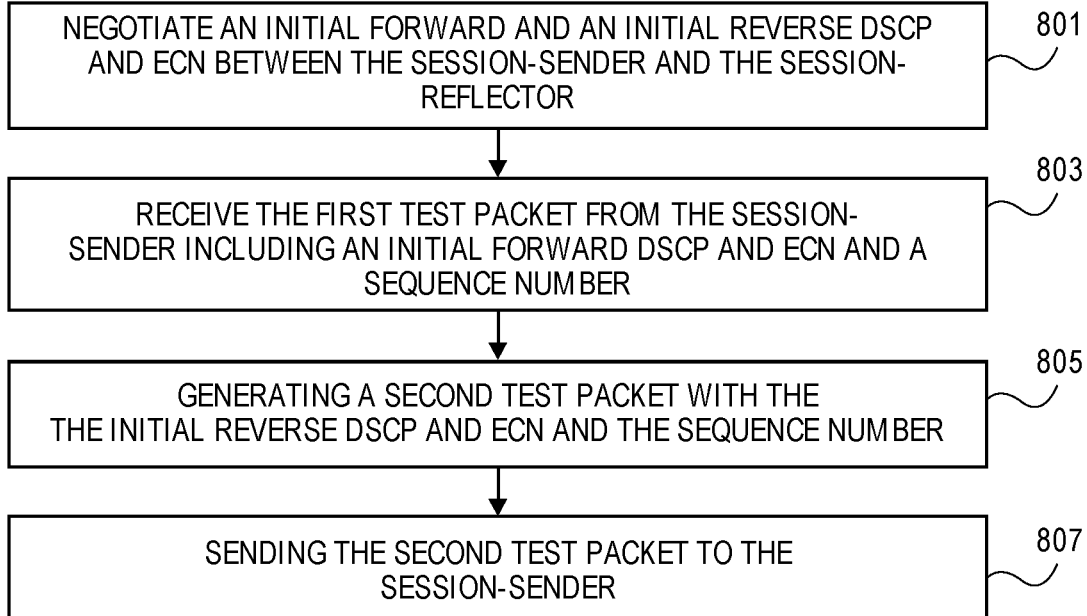
FIG. 8 is a flowchart of another example embodiment of a further process for the session-reflector of TWAMP.

FIG. 8 is a flowchart of another example embodiment of a further process for the session-reflector entity of TWAMP. In this alternate implementation the DSCP and ECN for a reverse direction testing is not sent in the first test packet. Instead it is separately negotiated by the control-client/ session-sender and server/session-reflector. This is complementary to the process for the session-sender of FIG. 7. In this case, a reverse DSCP and ECN to be utilized between the session-sender and session-reflector are negotiated by exchange of TWAMP control messages or using a similar mechanism (Block 801). The first test packet is then received by the session-reflector using the agreed upon initial DSCP and ECN for the forward direction (Block 803). The second test packet with the agreed upon reverse DSCP and ECN is then generated by the session-reflector using a sequence number in the received first test packet (Block 805). The negotiated DSCP and ECN can be utilized for any number of test packets to be tested within the same test session; however, the sequence number will be advanced as each test packet is generated to differentiate between the test packets. The second test packet with the same sequence number is then sent by the session-reflector (Block 807).

Figure 9:
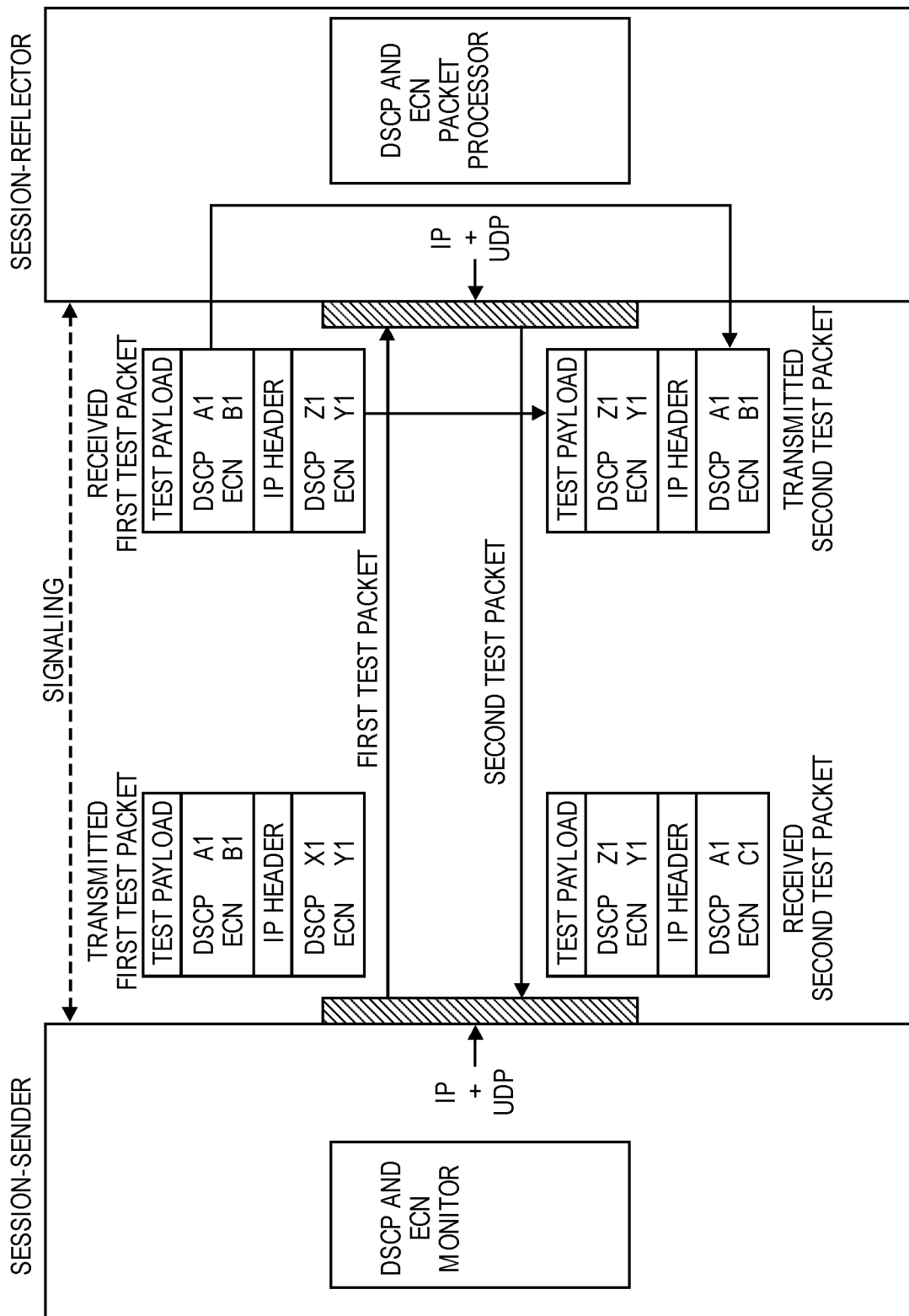
FIG. 9 is an example test session between a session-sender and session-reflector.

FIG. 9 is an example test session between a session-sender and session-reflector. This example illustrates a scenario with a session-sender communicating with a session-reflector. The session-sender and session-reflector establish a connection such as a transmission control protocol (TCP) between the session-sender and session-reflector. The session-sender includes a DSCP and ECN Monitor (e.g., as part of a test session manager or similar component). The session-sender generates and sends a first test packet that includes a payload having an initial reverse DSCP and ECN (e.g., DSCP A1 and ECN B1) for the reverse direction and an IP header with another DSCP and ECN combination (e.g., DSCP X1 and ECN Y1). The first test packet along the route is modified such that the DSCP becomes Z1. The DSCP and ECN can be modified by any intermediate network device.

The session-reflector receives the first test packet via an IP and UDP or TCP port. The session-reflector can include a DSCP and ECN packet processor in a test session manager or similar component. The session-reflector generates a second test packet with an IP header including the DSCP and ECN specified in the first test packet payload. The final forward DSCP and ECN received in the first test packet IP header (e.g., DSCP Z1 and ECN Y1) is also added to the second test packet in the payload to be verified at the session-sender. The initial reverse DSCP and ECN (e.g., DSCP A1 and ECN B1) specified in the received first test packet payload is utilized as the IP header DSCP and ECN in the transmitted second test packet. The transmitted second test packet is received at the session-sender. In this example case ECN in the IP header has been modified (e.g., ECN C1). Thus, the testing in the forward and reverse directions is separated allowing the session-sender to identify changes in DSCP and ECN specific to the forward and reverse directions.

The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Architecture

Figure 10A:
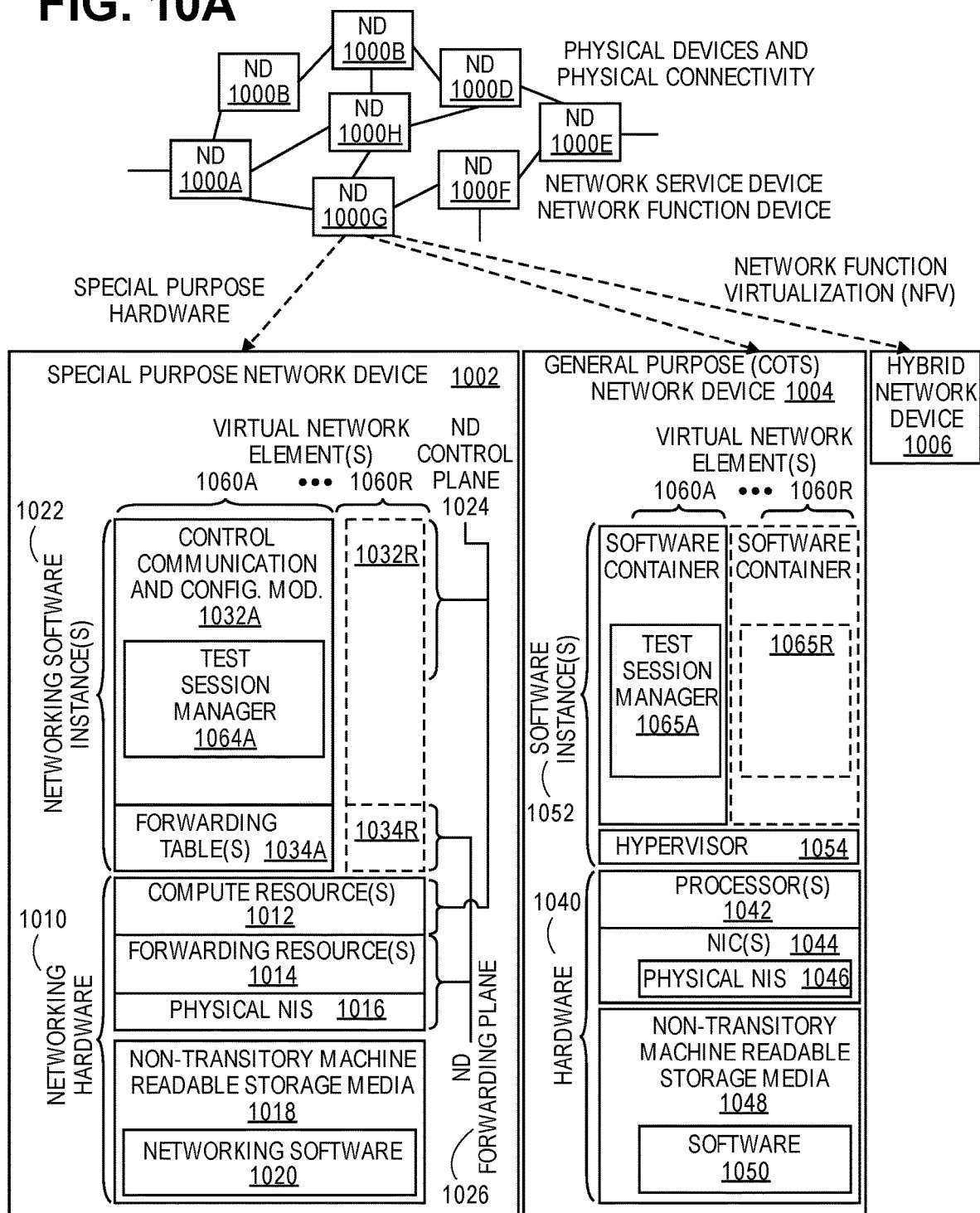
FIG. 10A illustrates connectivity between network devices (NDs) within an exemplary network, as well as three exemplary implementations of the NDs, according to some embodiments of the invention.

FIG. 10A illustrates connectivity between network devices (NDs) within an exemplary network, as well as three exemplary implementations of the NDs, according to some embodiments of the invention. FIG. 10A shows NDs 1000A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 1000A, E, and F illustrates that these NDs act as ingress and egress points for the network (and thus, these NDs are sometimes referred to as edge NDs; while the other NDs may be called core NDs).

Two of the exemplary ND implementations in FIG. 10A are: 1) a special-purpose network device 1002 that uses custom application-specific integrated-circuits (ASICs) and a proprietary operating system (OS); and 2) a general purpose network device 1004 that uses common off-the-shelf (COTS) processors and a standard OS.

The special-purpose network device 1002 includes networking hardware 1010 comprising compute resource(s) 1012 (which typically include a set of one or more processors), forwarding resource(s) 1014 (which typically include one or more ASICs and/or network processors), and physical network interfaces (NIs) 1016 (sometimes called physical ports), as well as non-transitory machine readable storage media 1018 having stored therein networking software 1020. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1000A-H. During operation, the networking software 1020 may be executed by the networking hardware 1010 to instantiate a set of one or more networking software instance(s) 1022. Each of the networking software instance(s) 1022, and that part of the networking hardware 1010 that executes that network software instance (be it hardware dedicated to that networking software instance and/or time slices of hardware temporally shared by that networking software instance with others of the networking software instance(s) 1022), form a separate virtual network element 1030A-R. Each of the virtual network element(s) (VNEs) 1030A-R includes a control communication and configuration module 1032A-R (sometimes referred to as a local control module or control communication module) and forwarding table(s) 1034A-R, such that a given virtual network element (e.g., 1030A) includes the control communication and configuration module (e.g., 1032A), a set of one or more forwarding table(s) (e.g., 1034A), and that portion of the networking hardware 1010 that executes the virtual network element (e.g., 1030A).

Software 1020 can include code which when executed by networking hardware 1010, causes networking hardware 1010 to perform operations of one or more embodiments of the present invention as part networking software instances 1022. The software 1020 can include a test session manager 1064A that encompasses the DSCP and ECN monitor and/or the DSCP and ECN packet processor that implement the methods of the server, control-client, session-sender and/or session-reflector. In one embodiment, the test session manager 1064A is implemented by the server or control-client, the DSCP and ECN monitoring is implemented by a session-sender and the DSCP and ECN packet processor is implemented by the session-reflector.

The special-purpose network device 1002 is often physically and/or logically considered to include: 1) a ND control plane 1024 (sometimes referred to as a control plane) comprising the compute resource(s) 1012 that execute the control communication and configuration module(s) 1032A-R; and 2) a ND forwarding plane 1026 (sometimes referred to as a forwarding plane, a data plane, or a media plane) comprising the forwarding resource(s) 1014 that utilize the forwarding table(s) 1034A-R and the physical NIs 1016. By way of example, where the ND is a router (or is implementing routing functionality), the ND control plane 1024 (the compute resource(s) 1012 executing the control communication and configuration module(s) 1032A-R) is typically responsible for participating in controlling how data (e.g., packets) is to be routed (e.g., the next hop for the data and the outgoing physical NI for that data) and storing that routing information in the forwarding table(s) 1034A-R, and the ND forwarding plane 1026 is responsible for receiving that data on the physical NIs 1016 and forwarding that data out the appropriate ones of the physical NIs 1016 based on the forwarding table(s) 1034A-R.

Figure 10B:
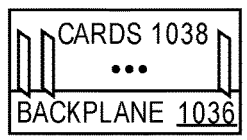
FIG. 10B illustrates an exemplary way to implement a special-purpose network device according to some embodiments of the invention.

FIG. 10B illustrates an exemplary way to implement the special-purpose network device 1002 according to some embodiments of the invention. FIG. 10B shows a special-purpose network device including cards 1038 (typically hot pluggable). While in some embodiments the cards 1038 are of two types (one or more that operate as the ND forwarding plane 1026 (sometimes called line cards), and one or more that operate to implement the ND control plane 1024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1036 (e.g., a first full mesh coupling the line cards and a second full mesh coupling all of the cards).

Returning to FIG. 10A, the general purpose network device 1004 includes hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein software 1050. During operation, the processor(s) 1042 execute the software 1050 to instantiate one or more sets of one or more applications 1064A-R. While one embodiment does not implement virtualization, alternative embodiments may use different forms of virtualization—represented by a virtualization layer 1054 and software containers 1062A-R. For example, one such alternative embodiment implements operating system-level virtualization, in which case the virtualization layer 1054 represents the kernel of an operating system (or a shim executing on a base operating system) that allows for the creation of multiple software containers 1062A-R that may each be used to execute one of the sets of applications 1064A-R. In this embodiment, the multiple software containers 1062A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 1054 represents a hypervisor (sometimes referred to as a virtual machine monitor (VMM)) or a hypervisor executing on top of a host operating system; and 2) the software containers 1062A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 1064A-R, as well as the virtualization layer 1054 and software containers 1062A-R if implemented, are collectively referred to as software instance(s) 1052. Each set of applications 1064A-R, corresponding software container 1062A-R if implemented, and that part of the hardware 1040 that executes them (be it hardware dedicated to that execution and/or time slices of hardware temporally shared by software containers 1062A-R), forms a separate virtual network element(s) 1060A-R.

The virtual network element(s) 1060A-R perform similar functionality to the virtual network element(s) 1030A-R—e.g., similar to the control communication and configuration module(s) 1032A and forwarding table(s) 1034A (this virtualization of the hardware 1040 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 1062A-R differently. For example, while embodiments of the invention are illustrated with each software container 1062A-R corresponding to one VNE 1060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1062A-R to VNEs also apply to embodiments where such a finer level of granularity is used.

In certain embodiments, the virtualization layer 1054 includes a virtual switch that provides similar forwarding services as a physical Ethernet switch. Specifically, this virtual switch forwards traffic between software containers 1062A-R and the NIC(s) 1044, as well as optionally between the software containers 1062A-R; in addition, this virtual switch may enforce network isolation between the VNEs 1060A-R that by policy are not permitted to communicate with each other (e.g., by honoring virtual local area networks (VLANs)).

Software 1050 can include code which when executed by processor(s) 1042, cause processor(s) 1042 to perform operations of one or more embodiments of the present invention as part software containers 1062A-R. The software 1050 can include a test session manager 1065A that encompasses the DSCP and ECN monitor and/or the DSCP and ECN packet processor that implement the methods of the server, control-client, session-sender and/or session-reflector. In one embodiment, the test session manager 1064A is implemented by the server or control-client, the DSCP and ECN monitoring is implemented by a session-sender and the DSCP and ECN packet processor is implemented by the session-reflector.

The third exemplary ND implementation in FIG. 10A is a hybrid network device 1006, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 1002) could provide for para-virtualization to the networking hardware present in the hybrid network device 1006.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1030A-R, VNEs 1060A-R, and those in the hybrid network device 1006) receives data on the physical NIs (e.g., 1016, 1046) and forwards that data out the appropriate ones of the physical NIs (e.g., 1016, 1046). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 10C:
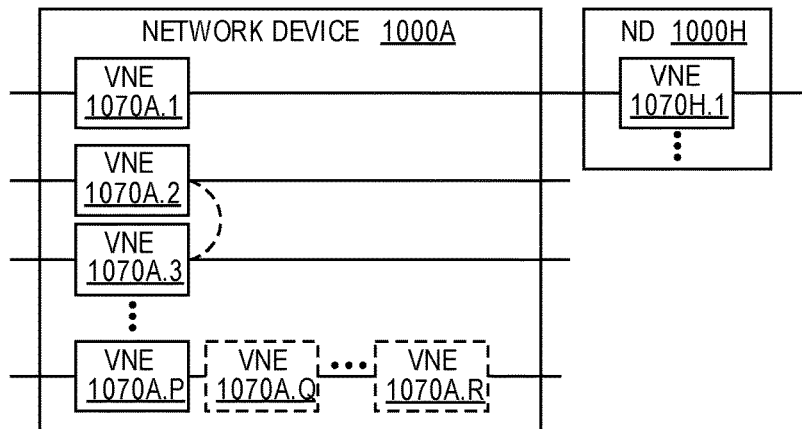
FIG. 10C illustrates various exemplary ways in which virtual network elements (VNEs) may be coupled according to some embodiments of the invention.

FIG. 10C illustrates various exemplary ways in which VNEs may be coupled according to some embodiments of the invention. FIG. 10C shows VNEs 1070A.1-1070A.P (and optionally VNEs 1070A.Q-1070A.R) implemented in ND 1000A and VNE 1070H.1 in ND 1000H. In FIG. 10C, VNEs 1070A.1-P are separate from each other in the sense that they can receive packets from outside ND 1000A and forward packets outside of ND 1000A; VNE 1070A.1 is coupled with VNE 1070H.1, and thus they communicate packets between their respective NDs; VNE 1070A.2-1070A.3 may optionally forward packets between themselves without forwarding them outside of the ND 1000A; and VNE 1070A.P may optionally be the first in a chain of VNEs that includes VNE 1070A.Q followed by VNE 1070A.R (this is sometimes referred to as dynamic service chaining, where each of the VNEs in the series of VNEs provides a different service—e.g., one or more layer 4-7 network services). While FIG. 10C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 10A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 10A may also host one or more such servers (e.g., in the case of the general purpose network device 1004, one or more of the software containers 1062A-R may operate as servers; the same would be true for the hybrid network device 1006; in the case of the special-purpose network device 1002, one or more such servers could also be run on a virtualization layer executed by the compute resource(s) 1012); in which case the servers are said to be co-located with the VNEs of that ND.

A virtual network is a logical abstraction of a physical network (such as that in FIG. 10A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 10D:
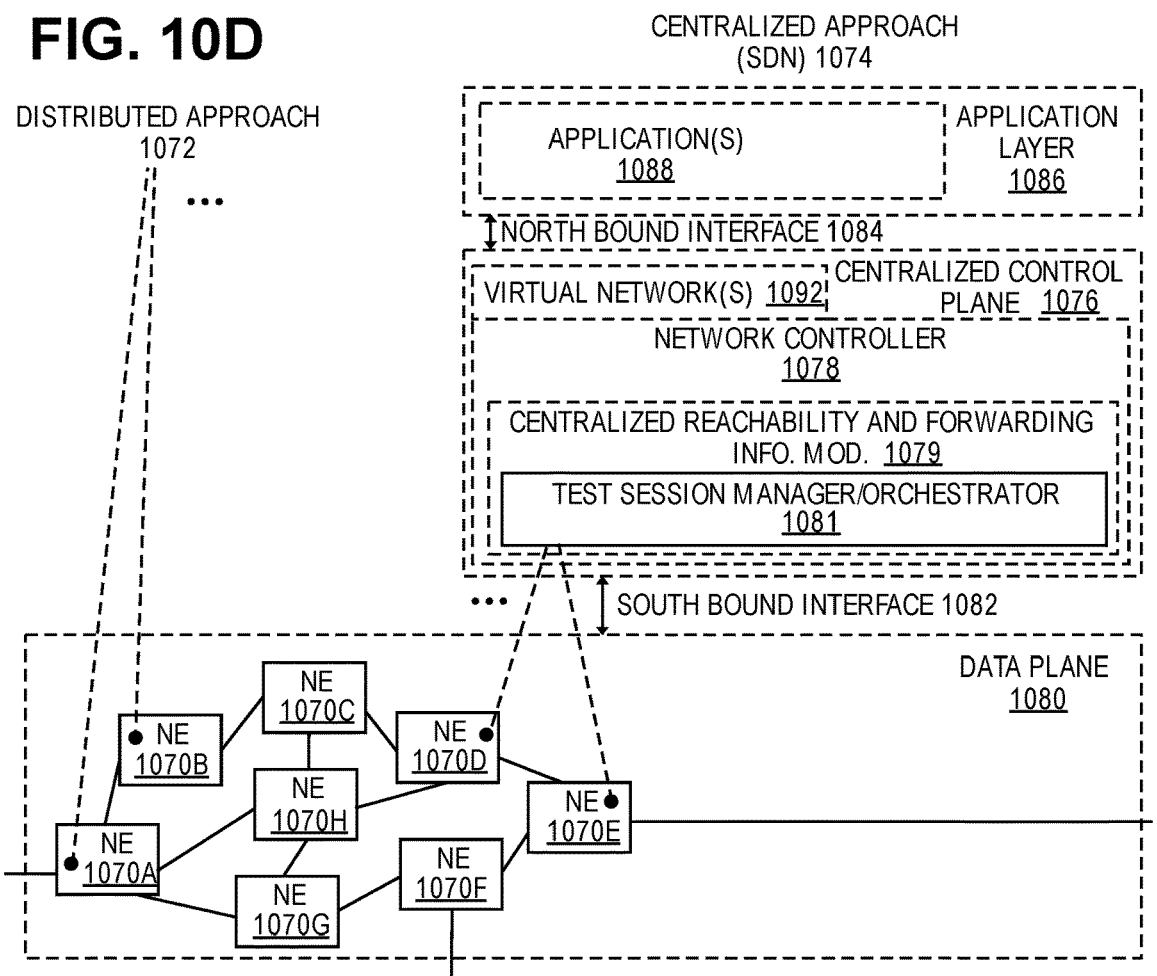
FIG. 10D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 10D illustrates a network with a single network element on each of the NDs of FIG. 10A, and within this straight forward approach contrasts a traditional distributed approach (commonly used by traditional routers) with a centralized approach for maintaining reachability and forwarding information (also called network control), according to some embodiments of the invention. Specifically, FIG. 10D illustrates network elements (NEs) 1070A-H with the same connectivity as the NDs 1000A-H of FIG. 10A.

FIG. 10D illustrates that the distributed approach 1072 distributes responsibility for generating the reachability and forwarding information across the NEs 1070A-H; in other words, the process of neighbor discovery and topology discovery is distributed.

For example, where the special-purpose network device 1002 is used, the control communication and configuration module(s) 1032A-R of the ND control plane 1024 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 1070A-H (e.g., the compute resource(s) 1012 executing the control communication and configuration module(s) 1032A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1024. The ND control plane 1024 programs the ND forwarding plane 1026 with information (e.g., adjacency and route information) based on the routing structure(s). For example, the ND control plane 1024 programs the adjacency and route information into one or more forwarding table(s) 1034A-R (e.g., Forwarding Information Base (FIB), Label Forwarding Information Base (LFIB), and one or more adjacency structures) on the ND forwarding plane 1026. For layer 2 forwarding, the ND can store one or more bridging tables that are used to forward data based on the layer 2 information in that data. While the above example uses the special-purpose network device 1002, the same distributed approach 1072 can be implemented on the general purpose network device 1004 and the hybrid network device 1006.

FIG. 10D illustrates that a centralized approach 1074 (also known as software defined networking (SDN)) that decouples the system that makes decisions about where traffic is sent from the underlying systems that forwards traffic to the selected destination. The illustrated centralized approach 1074 has the responsibility for the generation of reachability and forwarding information in a centralized control plane 1076 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1076 has a south bound interface 1082 with a data plane 1080 (sometime referred to the infrastructure layer, network forwarding plane, or forwarding plane (which should not be confused with a ND forwarding plane)) that includes the NEs 1070A-H (sometimes referred to as switches, forwarding elements, data plane elements, or nodes). The centralized control plane 1076 includes a network controller 1078, which includes a centralized reachability and forwarding information module 1079 that determines the reachability within the network and distributes the forwarding information to the NEs 1070A-H of the data plane 1080 over the south bound interface 1082 (which may use the OpenFlow protocol). Thus, the network intelligence is centralized in the centralized control plane 1076 executing on electronic devices that are typically separate from the NDs.

For example, where the special-purpose network device 1002 is used in the data plane 1080, each of the control communication and configuration module(s) 1032A-R of the ND control plane 1024 typically include a control agent that provides the VNE side of the south bound interface 1082. In this case, the ND control plane 1024 (the compute resource(s) 1012 executing the control communication and configuration module(s) 1032A-R) performs its responsibility for participating in controlling how data (e.g., packets) is to be routed (e.g., the next hop for the data and the outgoing physical NI for that data) through the control agent communicating with the centralized control plane 1076 to receive the forwarding information (and in some cases, the reachability information) from the centralized reachability and forwarding information module 1079 (it should be understood that in some embodiments of the invention, the control communication and configuration module(s) 1032A-R, in addition to communicating with the centralized control plane 1076, may also play some role in determining reachability and/or calculating forwarding information—albeit less so than in the case of a distributed approach; such embodiments are generally considered to fall under the centralized approach 1074, but may also be considered a hybrid approach).

While the above example uses the special-purpose network device 1002, the same centralized approach 1074 can be implemented with the general purpose network device 1004 (e.g., each of the VNE 1060A-R performs its responsibility for controlling how data (e.g., packets) is to be routed (e.g., the next hop for the data and the outgoing physical NI for that data) by communicating with the centralized control plane 1076 to receive the forwarding information (and in some cases, the reachability information) from the centralized reachability and forwarding information module 1079; it should be understood that in some embodiments of the invention, the VNEs 1060A-R, in addition to communicating with the centralized control plane 1076, may also play some role in determining reachability and/or calculating forwarding information—albeit less so than in the case of a distributed approach) and the hybrid network device 1006. In fact, the use of SDN techniques can enhance the NFV techniques typically used in the general purpose network device 1004 or hybrid network device 1006 implementations as NFV is able to support SDN by providing an infrastructure upon which the SDN software can be run, and NFV and SDN both aim to make use of commodity server hardware and physical switches.

In some embodiments, the centralized control plane 1064 can include code which when executed by a network device, causes the network device to perform operations of one or more embodiments of the present invention as part of a test session manager or Orchestrator 1081. The test session manager or orchestrator 1081 configures the session-sender and session-reflector as described herein above.

FIG. 10D also shows that the centralized control plane 1076 has a north bound interface 1084 to an application layer 1086, in which resides application(s) 1088. The centralized control plane 1076 has the ability to form virtual networks 1092 (sometimes referred to as a logical forwarding plane, network services, or overlay networks (with the NEs 1070A-H of the data plane 1080 being the underlay network)) for the application(s) 1088. Thus, the centralized control plane 1076 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 10D shows the distributed approach 1072 separate from the centralized approach 1074, the effort of network control may be distributed differently or the two combined in certain embodiments of the invention. For example: 1) embodiments may generally use the centralized approach (SDN) 1074, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1074, but may also be considered a hybrid approach.

While FIG. 10D illustrates the simple case where each of the NDs 1000A-H implements a single NE 1070A-H, it should be understood that the network control approaches described with reference to FIG. 10D also work for networks where one or more of the NDs 1000A-H implement multiple VNEs (e.g., VNEs 1030A-R, VNEs 1060A-R, those in the hybrid network device 1006). Alternatively or in addition, the network controller 1078 may also emulate the implementation of multiple VNEs in a single ND. Specifically, instead of (or in addition to) implementing multiple VNEs in a single ND, the network controller 1078 may present the implementation of a VNE/NE in a single ND as multiple VNEs in the virtual networks 1092 (all in the same one of the virtual network(s) 1092, each in different ones of the virtual network(s) 1092, or some combination). For example, the network controller 1078 may cause an ND to implement a single VNE (a NE) in the underlay network, and then logically divide up the resources of that NE within the centralized control plane 1076 to present different VNEs in the virtual network(s) 1092 (where these different VNEs in the overlay networks are sharing the resources of the single VNE/NE implementation on the ND in the underlay network).

Figure 10E:
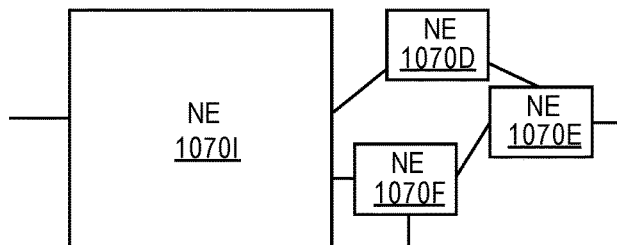
FIG. 10E illustrates the simple case of where each of the NDs implements a single NE, but a centralized control plane has abstracted multiple of the NEs in different NDs into (to represent) a single NE in one of the virtual network(s), according to some embodiments of the invention.
Figure 10F:
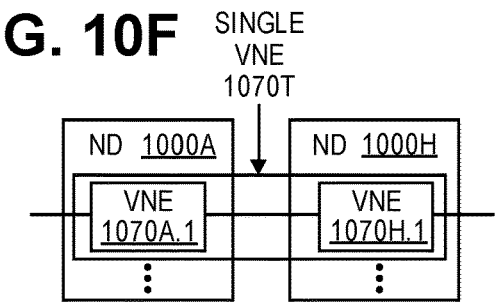
FIG. 10F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 10E and 10F respectively illustrate exemplary abstractions of NEs and VNEs that the network controller 1078 may present as part of different ones of the virtual networks 1092. FIG. 10E illustrates the simple case of where each of the NDs 1000A-H implements a single NE 1070A-H (see FIG. 10D), but the centralized control plane 1076 has abstracted multiple of the NEs in different NDs (the NEs 1070A-C and G-H) into (to represent) a single NE 1070I in one of the virtual network(s) 1092 of FIG. 10D, according to some embodiments of the invention. FIG. 10E shows that in this virtual network, the NE 1070I is coupled to NE 1070D and 1070F, which are both still coupled to NE 1070E.

FIG. 10F illustrates a case where multiple VNEs (VNE 1070A.1 and VNE 1070H.1) are implemented on different NDs (ND 1000A and ND 1000H) and are coupled to each other, and where the centralized control plane 1076 has abstracted these multiple VNEs such that they appear as a single VNE 1070T within one of the virtual networks 1092 of FIG. 10D, according to some embodiments of the invention. Thus, the abstraction of a NE or VNE can span multiple NDs.

While some embodiments of the invention implement the centralized control plane 1076 as a single entity (e.g., a single instance of software running on a single electronic device), alternative embodiments may spread the functionality across multiple entities for redundancy and/or scalability purposes (e.g., multiple instances of software running on different electronic devices).

Figure 11:
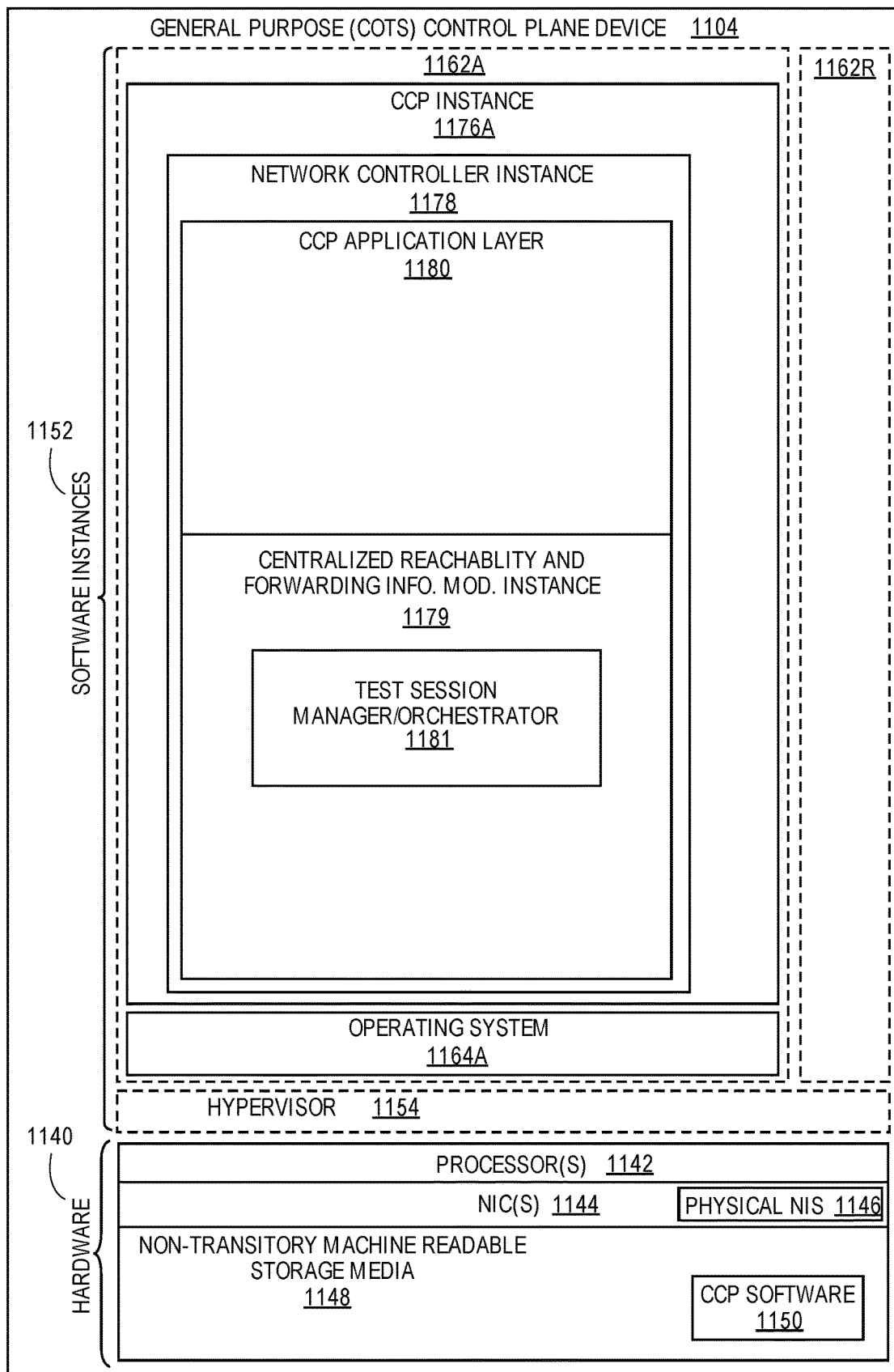
FIG. 11 illustrates a general purpose control plane device with centralized control plane (CCP) software, according to some embodiments of the invention.

Similar to the network device implementations, the electronic device(s) running the centralized control plane 1076, and thus the network controller 1078 including the centralized reachability and forwarding information module 1079, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 11 illustrates, a general purpose control plane device 1104 including hardware 1140 comprising a set of one or more processor(s) 1142 (which are often COTS processors) and network interface controller(s) 1144 (NICs; also known as network interface cards) (which include physical NIs 1146), as well as non-transitory machine readable storage media 1148 having stored therein centralized control plane (CCP) software 1150.

In embodiments that use compute virtualization, the processor(s) 1142 typically execute software to instantiate a virtualization layer 1154 and software container(s) 1162A-R (e.g., with operating system-level virtualization, the virtualization layer 1154 represents the kernel of an operating system (or a shim executing on a base operating system) that allows for the creation of multiple software containers 1162A-R (representing separate user space instances and also called virtualization engines, virtual private servers, or jails) that may each be used to execute a set of one or more applications; with full virtualization, the virtualization layer 1154 represents a hypervisor (sometimes referred to as a virtual machine monitor (VMM)) or a hypervisor executing on top of a host operating system, and the software containers 1162A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1150 (illustrated as CCP instance 1176A) is executed within the software container 1162A on the virtualization layer 1154. In embodiments where compute virtualization is not used, the CCP instance 1176A on top of a host operating system is executed on the "bare metal" general purpose control plane device 1104. The instantiation of the CCP instance 1176A, as well as the virtualization layer 1154 and software containers 1162A-R if implemented, are collectively referred to as software instance(s) 1152.

In some embodiments, the CCP instance 1176A includes a network controller instance 1178. The network controller instance 1178 includes a centralized reachability and forwarding information module instance 1179 (which is a middleware layer providing the context of the network controller 1078 to the operating system and communicating with the various NEs), and an CCP application layer 1180 (sometimes referred to as an application layer) over the middleware layer (providing the intelligence required for various network operations such as protocols, network situational awareness, and user—interfaces). At a more abstract level, this CCP application layer 1180 within the centralized control plane 1076 works with virtual network view(s) (logical view(s) of the network) and the middleware layer provides the conversion from the virtual networks to the physical view.

In some embodiments, the control plane device 1104 can include code which when executed, causes the control plane device to perform operations of one or more embodiments of the present invention as part of a test session manager or orchestrator 1181. The test session manager or orchestrator 1181 configures the session-sender and session-reflector as described herein above.

The centralized control plane 1076 transmits relevant messages to the data plane 1080 based on CCP application layer 1180 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1080 may receive different messages, and thus different forwarding information. The data plane 1080 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries.

It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1080, the packet (or a subset of the packet header and content) is typically forwarded to the centralized control plane 1076. The centralized control plane 1076 will then program forwarding table entries into the data plane 1080 to accommodate packets belonging to the flow of the unknown packet. Once a specific forwarding table entry has been programmed into the data plane 1080 by the centralized control plane 1076, the next packet with matching credentials will match that forwarding table entry and take the set of actions associated with that matched entry.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method executed by a network device implementing a control-client, the method comprising:
    receiving a server greeting message from a server including characteristics of a session-reflector;
    determining whether the session-reflector supports use of a first differentiated services code point (DSCP) in a first test packet and a second DSCP in a second test packet in in a single test session between the session-reflector and a session-sender;
    setting a set-up-response message to indicate DSCP and explicit congestion notification (ECN) testing;
    determining whether the session-reflector supports DSCP and ECN monitoring;
    adding an indicator of DSCP and ECN monitoring in the set-up-response message, in response to a determination that the session-reflector supports DSCP and ECN monitoring; and
    sending the set-up-response message to the server to configure the session-reflector to monitor DSCP and ECN for modification in the single test session in a forward direction.

2. The method of claim 1, wherein the server greeting message includes a field indicating session-reflector support for use of multiple DSCP in the single test session.

3. The method of claim 1, wherein the server greeting message includes a field indicating session-reflector support for DSCP and ECN monitoring.

4. The method of claim 1, wherein the single test session is a two-way active measurement protocol (TWAMP) test session.

5. The method of claim 1, further comprising:
    setting up multiple test sessions between the session-sender and the session-reflector to test multiple DSCP or ECN, in response to determining the session-reflector does not support multiple DSCP in the single session.

6. A network device implementing a client-controller, the network device comprising:
    a non-transitory machine readable medium having stored therein a test session manager; and
    a processor coupled to the non-transitory machine readable medium, the processor to execute the test session manager, the test session manager configured to receive a server greeting message from a server including characteristics of a session-reflector, to determine whether the session-reflector supports use of a first differentiated services code point (DSCP) in a first test packet and a second DSCP in a second test packet in a single test session between the session-reflector and a session-sender, to set a set-up-response message to indicate DSCP and explicit congestion notification (ECN) testing, to determine whether the session-reflector supports DSCP and ECN monitoring, to add an indicator of DSCP and ECN monitoring in the set-up-response message, in response to a determination that the session-reflector supports DSCP and ECN monitoring, and to send the set-up-response message to the server to configure the session-reflector to monitor DSCP and ECN for modification in the single test session in a forward direction.

7. The network device of claim 6, wherein the server greeting message includes a field indicating session-reflector support for use of multiple DSCP in the single test session.

8. The network device of claim 6, wherein the server greeting message includes a field indicating session-reflector support for DSCP and ECN monitoring.

9. The network device of claim 6, wherein the single test session is a two-way active measurement protocol (TWAMP) test session.

10. The network device of claim 6, wherein the test session manager is further configured to set up multiple test sessions between the session-sender and the session-reflector to test multiple DSCP or ECN, in response to determining the session-reflector does not support multiple DSCP in the single session.

11. A computing device in communication with a network device in a network with a plurality of network devices, the computing device to execute a plurality of virtual machines for implementing network function virtualization (NFV), wherein a virtual machine from the plurality of virtual machines executes a client-controller, the computing device comprising:
    a non-transitory machine readable medium having stored therein a test session manager; and
    a processor coupled to the non-transitory machine readable medium, the processor to execute a virtual machine, the virtual machine to execute the test session manager, test session manager configured to receive a server greeting message from a server including characteristics of a session-reflector, to determine whether the session-reflector supports use of a first differentiated services code point (DSCP) in a first test packet and a second DSCP in a second test packet in a single test session between the session-reflector and a session-sender, to set a set-up-response message to indicate DSCP and explicit congestion notification (ECN) testing, to determine whether the session-reflector supports DSCP and ECN monitoring, to add an indicator of DSCP and ECN monitoring in the set-up-response message, in response to a determination that the session-reflector supports DSCP and ECN monitoring, and to send the set-up-response message to the server to configure the session-reflector to monitor DSCP and ECN for modification in the single test session in a forward direction.

12. The computing device of claim 11, wherein the server greeting message includes a field indicating session-reflector support for use of multiple DSCP in the single test session.

13. The computing device of claim 11, wherein the server greeting message includes a field indicating session-reflector support for DSCP and ECN monitoring.

14. The computing device of claim 11, wherein the single test session is a two-way active measurement protocol (TWAMP) test session.

15. The computing device of claim 11, wherein the test session manager is further configured to set up multiple test sessions between the session-sender and the session-reflector to test multiple DSCP or ECN, in response to determining the session-reflector does not support multiple DSCP in the single session.

16. A control plane device configured to implement a control plane of a software defined networking (SDN) network including a plurality of network devices, wherein the control plane device is configured to execute a method to implement an orchestrator the control plane device comprising:
  a non-transitory machine readable medium having stored therein the orchestrator; and
  a processor coupled to the non-transitory machine readable medium, the processor to execute the orchestrator, the orchestrator configured to determine characteristics of the session-reflector, to determine whether the session-reflector supports use of a first differentiated services code point (DSCP) in a first test packet and a second DSCP in a second test packet in a single test session, to set a configuration message to indicate DSCP and explicit congestion notification (ECN) testing, to determine whether the session-reflector supports DSCP and ECN monitoring, to add an indicator of DSCP and ECN monitoring in the configuration message, in response to a determination that the session-reflector supports DSCP and ECN monitoring, and to send the configuration message to the session-sender and session-reflector to configure the session-reflector and session-sender to monitor DSCP and ECN for modification in a single test session in a forward direction and a reverse direction.

17. The control plane device of claim 16, wherein the configuration message includes a field identifying DSCP and ECN values to be tested.

18. The control plane device of claim 16, wherein the single test session is a two-way active measurement protocol (TWAMP) test session.

19. The control plane device of claim 16, wherein the orchestrator further configured to set up multiple test sessions between the session-sender and the session-reflector to test multiple DSCP or ECN, in response to determining the session-reflector does not support multiple DSCP in the single session.

* * * * *

UNITED STATES PATENT AND TRADEMARK OFFICE
CERTIFICATE OF CORRECTION

PATENT NO. : 10,965,576 B2  
APPLICATION NO. : 16/075133  
DATED : March 30, 2021  
INVENTOR(S) : Mirsky et al.

Page 1 of 1

It is certified that error appears in the above-identified patent and that said Letters Patent is hereby corrected as shown below:

In the Specification

In Column 1, Line 13, insert -- The present application is related to U.S. Application No. 16/075,134, titled "Method and Apparatus for Data Plane To Monitor Differentiated Services Code Point (DSCP) and Explicit Congestion Notification (ECN)," which is a national stage of International Application No. PCT/IB2016/050616, filed February 5, 2016, which are hereby incorporated by reference. --, therefor.

In Column 11, Lines 10-11, delete "is determine determined" and insert -- is determined --, therefor.

In the Claims

In Column 25, Line 39, in Claim 1, delete "packet in in a" and insert -- packet in a --, therefor.

In Column 26, Line 53, in Claim 11, delete "manager, test" and insert -- manager, the test --, therefor.

In Column 27, Line 23, in Claim 16, delete "orchestrator the" and insert -- orchestrator, the --, therefor.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*